US007160068B2

(12) United States Patent
Scialabba et al.

(10) Patent No.: US 7,160,068 B2
(45) Date of Patent: Jan. 9, 2007

(54) DEVICE FOR SECURING A WHEELCHAIR, SCOOTER, OR TRANSPORTABLE EQUIPMENT

(75) Inventors: Carmen Scialabba, Silver Spring, MD (US); James Liska, Bridgeville, PA (US); Jeffery Donati, Imperial, PA (US)

(73) Assignee: ADA Technologies, Inc., Bridgeville, PA (US)

( * ) Notice: Subject to any disclaimer, the term of this patent is extended or adjusted under 35 U.S.C. 154(b) by 59 days.

(21) Appl. No.: 11/147,193

(22) Filed: Jun. 8, 2005

(65) Prior Publication Data

US 2005/0269798 A1 Dec. 8, 2005

Related U.S. Application Data

(60) Provisional application No. 60/577,605, filed on Jun. 8, 2004.

(51) Int. Cl.
*B60P 7/08* (2006.01)

(52) U.S. Cl. .................... 410/7; 410/8; 410/11; 410/23

(58) Field of Classification Search .................... 410/3, 410/4, 7–11, 23, 51; 248/499; 296/65.04; 280/304.1

See application file for complete search history.

(56) References Cited

U.S. PATENT DOCUMENTS 5,391,030 A * 2/1995 Lee .............................. 410/12
6,568,646 B1 * 5/2003 Wess et al.
6,575,677 B1 * 6/2003 Craft .............................. 410/7

* cited by examiner

*Primary Examiner*—Stephen Gordon
(74) *Attorney, Agent, or Firm*—McIntyre Harbin & King LLP

(57) ABSTRACT

A flush-mounted securing device, preferably secured in a floor of a vehicle, to restrain a handicapped person in a wheelchair or scooter in a passenger vehicle. The securing device comprises a base plate, a top plate rotationally mounted relative to the base plate and including a series of belt or strap receptacles to fasten the transportable equipment, a low-profile shaft that axially supports the top plate for rotational movement against lateral forces between the top plane and base plate, a set of circumferentially disposed bearings (or slip rings) between the top plate and the base plate, and a retaining cap that secures the top plate to the base plate. Optionally, the device may include a locking/ratcheting mechanism to fixedly position the top plate at discrete rotational positions to assist passenger ingress/egress.

10 Claims, 11 Drawing Sheets

FIG. 7A
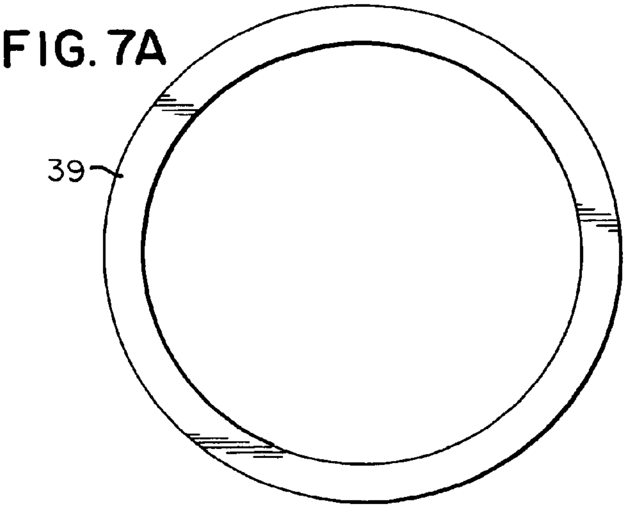
FIG. 7B
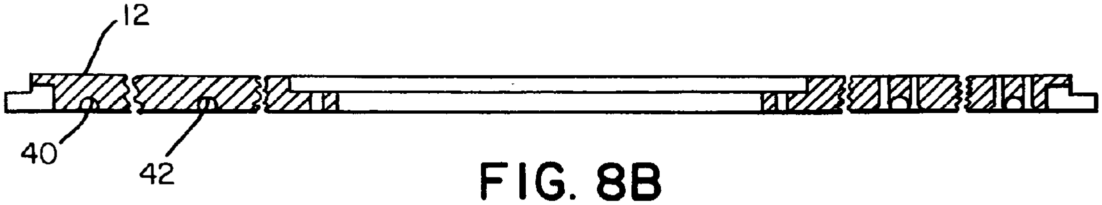
FIG. 8B
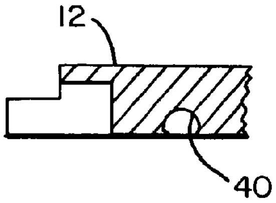
FIG. 8C
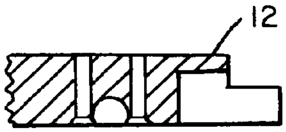
FIG. 8D

DEVICE FOR SECURING A WHEELCHAIR, SCOOTER, OR TRANSPORTABLE EQUIPMENT

CROSS-REFERENCE TO RELATED PATENTS

This application claims the benefit of Provisional Application Ser. No. 60/577,605 entitled "Device for Securing a Wheelchair, Scooter, or Transportable Equipment" filed Jun. 8, 2004 in the names of the same inventors hereof. The disclosure of the Provisional Application is incorporated herein.

This invention is also related to and an improvement over the invention of U.S. Pat. No. 6,568,646, entitled Wheelchair Swivel Platform, which issued May 27, 2003 to some of the inventors hereof.

BACKGROUND

The present invention relates to a securing device for vehicle-transportable implement, but more specifically to a passenger restrain device for a person confined to wheelchair in a motor vehicle such as a train, bus, or other public transportation vehicle.

The invention preferably provides a flush-mounted rotational platform mounted in the floor of a motor vehicle to provide support during transport of persons confined to a wheelchair. The invention may also be useful to transport scooters, or other devices or equipment requiring restraint. It is specially designed for public transportation vehicles, such as buses and trains, to enable convenient ingress/egress but yet being fully compliant with restraint requirements specified by transportation laws and regulations.

In U.S. Pat. No. 6,568,646 that issued in the names of certain inventors hereof, this is provided a low-profile swivel platform principally designed for handicapped persons in an office environment. The swivel platform enabled a person in a wheelchair to swivel at a work desk in much the same manner as a person sitting in a swivel office chair. The device comprised a base plate mounted on the floor and a rotatable top plate that receive the wheel chair. The top plate rotated about a relative small bearing shaft at the center and a set of nylon ball bearings disposed in concentric raceways or grooves of the base plate. The device was found quite durable and useful in supporting substantial weight, quite operation, and extremely durable.

In order to extend the usefulness of a handicap platform to passenger vehicle, certain improvements were necessary to render the device convenient for ingress/egress, to provide ease of use and operation, and to comply with passenger restraint regulations. Prior swivel platforms, for example, lacked a "seat belt" restraint, did not provide stationary or discrete rotational positions of the platform to assist positioning of the handicapped person, and required further improvements in swivel stability, low profile thinness, and durability.

SUMMARY

According to an aspect of the invention, there is provided a vehicle-mounted wheelchair swivel device to secure a handicapped person and a wheelchair or scooter. A first embodiment of the device comprises a base plate mountable in a floor of a vehicle, a top plate rotationally mounted relative to the base plate and including a series of seat belt receptacles to receive straps that secure the handicapped person and the wheelchair or scooter, a low-profile shaft that axially supports the top plate for rotational movement relative to the base plate wherein the shaft has a diameter relative to the diameter of the rotating periphery of the top plate so as to constrain radial movement of the top plate against lateral forces produced during vehicle transport, a set of ball bearings between the top plate and the base plate circumferentially disposed around a rotational axis of the top plate, and a retaining cap that secures the top plate relative to the base plate.

Another aspect of the invention comprises a vehicle-mounted swivel device to secure a handicapped person and a wheelchair or scooter in a motor vehicle that comprises a base plate mountable relative to a floor of a vehicle, a top plate rotationally mounted relative to the base plate and including a series of seat belt receptacles to receive straps that secure the wheelchair or scooter, a low-profile shaft that axially supports the top plate for rotational movement relative to the base plate, said shaft having a diameter of at least 10% of the diameter of the rotating periphery of the top plate so as to constrain radial movement of the top plate against lateral forces produced during vehicle transport, a set of nylon ball bearings between the top plate and the base plate circumferentially disposed around a rotational axis of the top plate, a retaining cap that secures the top plate relative to the base plate, and a locking/ratcheting mechanism to secure rotational position of the top plate at discrete rotational positions relative to the bottom plate. The locking mechanism may comprise a spring-loaded plunger fixedly position relative to the base plate and operable to engage one of a series of detents in a peripheral edge associated with the top plate whereby to fixedly position the top plate at discrete rotational positions.

Other aspects of the invention will become apparent upon review of the following description taken in connection with the accompanying drawings. The invention though is pointed out with particularity by the appended claims.

BRIEF DESCRIPTION OF THE DRAWINGS

FIGS. 7A and 7B show a thrust bearing to help reduce friction between the top and bottom plates when rotated relative to each other.

FIG. 8B is a side view of the top plate of FIG. 8A.

FIGS. 8C and 8D show peripheral details of the top plate of FIGS. 8A and 8B.

DESCRIPTION OF ILLUSTRATIVE EMBODIMENTS

Figure 1:
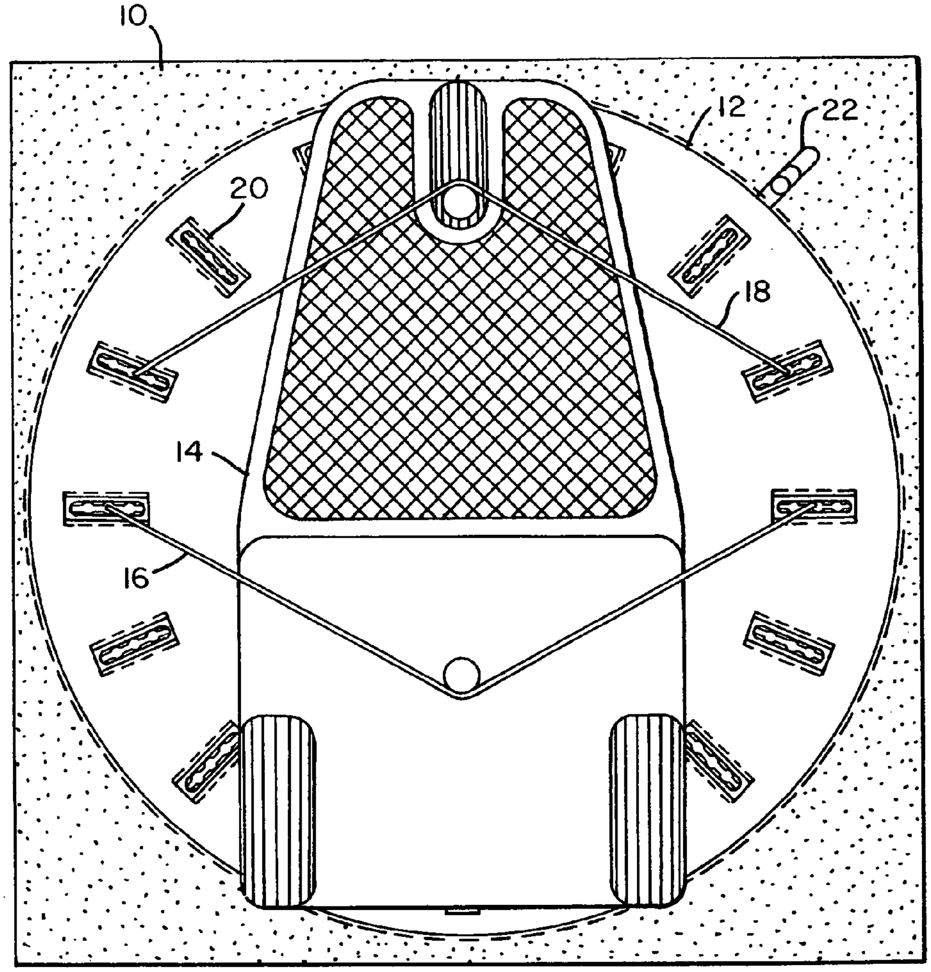
FIG. 1 shows a wheelchair or scooter device secured via seatbelt straps to a securing device, e.g., a receiving platform, constructed according to one embodiment of the present invention.
Figure 2:
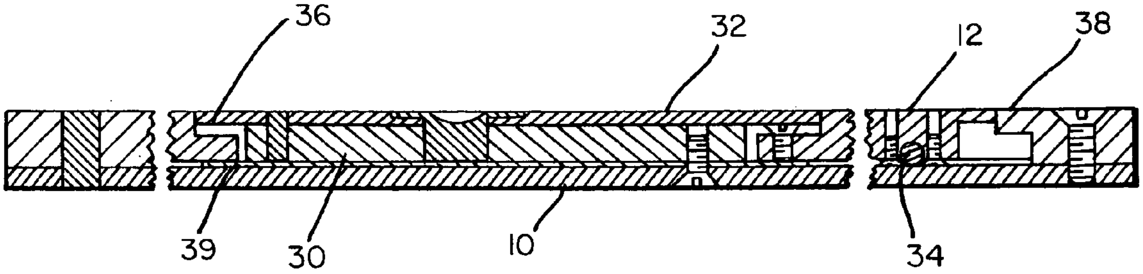
FIG. 2 shows a side view of the securing device of FIG. 1 without the wheelchair or scooter.

FIGS. 1 and 2 show a device to secure a wheelchair, scooter, or other object to a rotatable, low-profile securing platform according to an aspect of the invention. FIG. 1 includes a depiction of a wheelchair or scooter 14. The novel low-profile platform is particularly useful to aid ingress and egress of handicapped persons in transportation vehicles, such as buses, trains, or other vehicles where restraint is required after being positioned in the vehicle. The low-profile device comprises a base plate 10 secured to the floor of the vehicle with a recess or upon the surface of the vehicle floor. In one embodiment, base plate 10 measures 48"×48" and rotationally supports a circular top plate 12.

Top plate 12 may include a series of circumferentially disposed belt slots 20 through which conventional restraining belts 16 and 18 attach to support equipment 14, which may comprise a wheelchair, scooter, or any other transportable piece of equipment. Similarly, the scooter or wheelchair may include conventional belt strap receptacles, latches, etc. to receive straps 16, 18 in order to restrain the handicapped person as well as the wheelchair or scooter against forces exerted upon them during vehicle transport. When used to support handicap equipment, base plate 10 is preferably bolted to a floor of a vehicle. Preferably, base plate 10 and top plate 12 are flush-mounted within a vehicle floor to enable convenient ingress and egress of mobile equipment. To facilitate ingress/egress, top plate 12 may be rotated to a desired angular position and locked relative to base plate 10 via a locking pin assembly, one of which is shown at 22. This is particularly advantageous for wheelchair or scooter access. In one embodiment, the securing device is substantially made of aluminum, measures four feet square, and has a depth of three-fourths of an inch.

Figure 3:
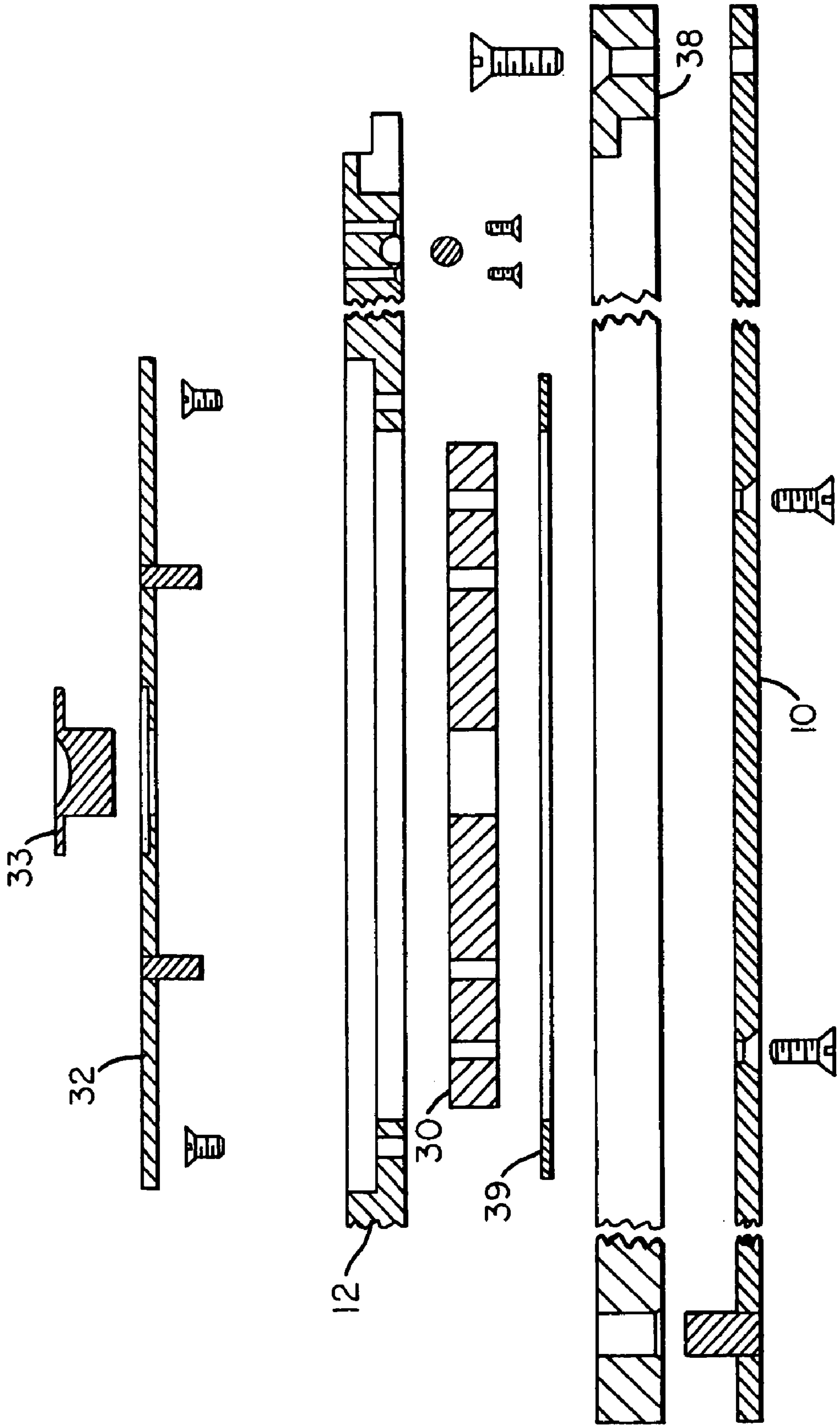
FIG. 3 depicts an exploded view of elements of the securing device of FIG. 2.

FIG. 2 is a cross-sectional view of the securing device of FIG. 1 where the base plate 10 is shown to support a low-profile shaft that is held in place against the base plate 10 by cap 32 (also shown in FIG. 3). Advantageously, shaft 30 has a relative large diameter of the rotating periphery of the top plate, e.g., 10% or more to better constrain radial movement of the top plate relative to its axis. In the illustrated embodiment, the shaft diameter is six inches whereas the diameter of the top plate is forty-five inches. This way, the top plate is better constrained relative to its axis of rotation against laterally shifting forces during vehicle transport and/or during wheelchair ingress/egress. Low-profile shaft 30 also rotationally supports top plate 12 against a set of peripherally disposed nylon ball bearings 34 that interfaces base plate 10 and rotatable top plate 12. These bearings may be steel, or may alternatively comprise rollers instead of balls. Alternatively, such ball or roller bearings may altogether be eliminated in lieu of other friction reducing mechanisms, such as a fluid barrier or slip rings. A circumferentially disposed radial bearing 36 provides lateral support for top plate 12 while retaining ring 38, held to the base plate 10 by a set of flat-head screws, maintains axial fixation of the top plate 12 on shaft 30 relative to base plate 10 to enable rotation and locking of the top plate against lateral and axial forces of the equipment to be secured. A nylon thrust bearing 39 helps reduce rotational friction of the top plate 12 against the bottom plate 10.

FIG. 3 is an exploded view of the securing device of FIG. 2, and shows a base plate 10, top plate 12, a retaining ring 38 adapted to be disposed upon the base plate 10, thrust bearing 39 that helps reduce friction when top plate 12 rotates upon the bottom plate 10 under weight of transported equipment or an individual in a wheelchair, a low-profile shaft 30 that maintains axial alignment of the top plate 12 when rotated, and a cap 32 that holds the top plate 12 against the bottom plate 10. Cap 32 is secured to the bottom plate 10 by a low-profile bolt 33.

Figure 4A:
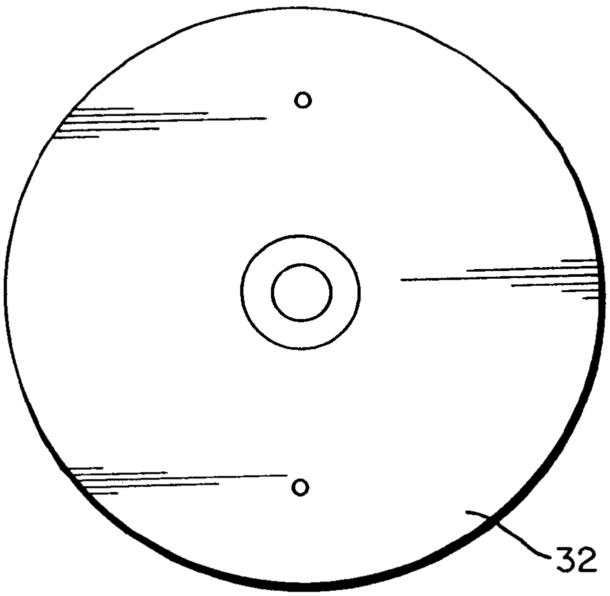
FIGS. 4A, 4B, 4C, and 4D show plan and side views of a retaining plate and threaded cap used to fasten a top plate to the bottom plate of the securing device.
Figure 4D:
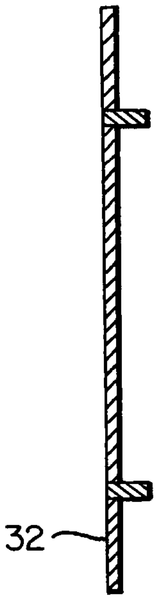
Figure 4B:
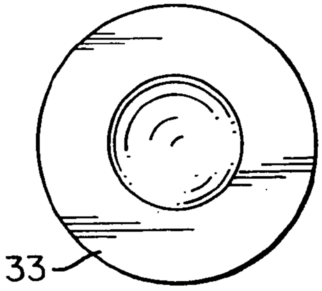
Figure 4C:
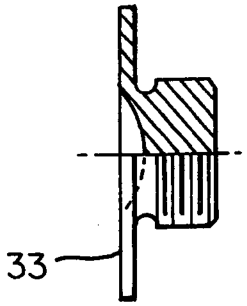

FIGS. 4A and 4D show top and side views of a retaining plate 32 that fastens the top plate 12 to base plate 10 the securing device. Retaining plate 32 includes a pair of interlocking pins that interlock with complementary receptacles of shaft 30 (as illustrated in FIG. 3) while a pair of screws fasten the base plate 10 to shaft 30 (also illustrated in FIG. 3). This way, the cap 32, shaft 30, and base plate 10 are rotatably fixed relative to each other, while top plate 12, which carries the weight of the wheel chair or transportable equipment, remains free to rotate around shaft 30 and upon thrust bearing 39. FIGS. 4B and 4C show top and side views of a threaded cap that fastens the retaining plate 32 to shaft 30 to prevent axial separation of these components. Other fastening means as known in the art may also be employed.

Figure 5A:
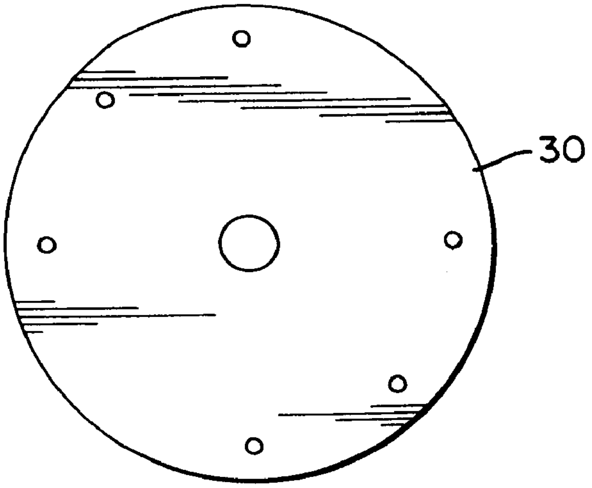
FIGS. 5A and 5B depict top and side views of a low-profile shaft that supports a rotatable top plate of the securing device of FIG. 1.
Figure 5B:
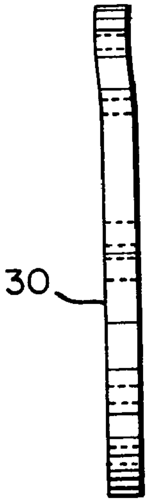
Figure 6A:
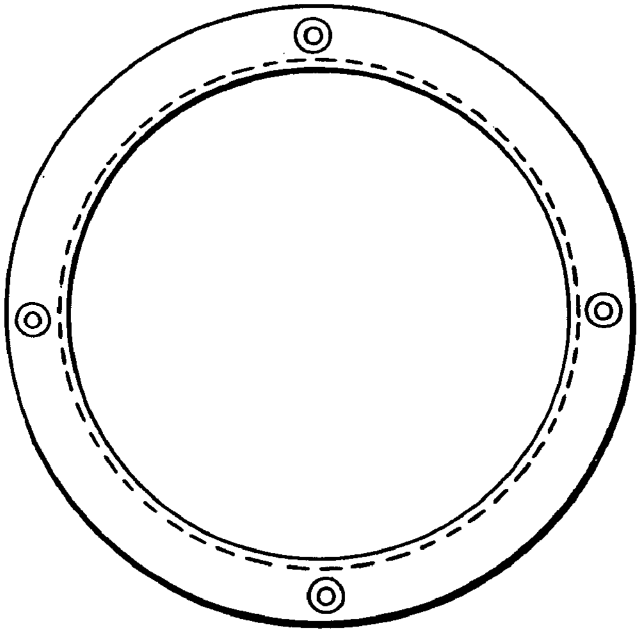
FIGS. 6A and 6B depict top and side views of an optional oil-impregnated nylon bearing positioned between the rotatable top plate and a shaft that maintains axial alignment of the top plate relative to a rotational axis of the bottom plate.
Figure 6B:

FIGS. 5A and 5B show top and side view of low-profile shaft 30. FIGS. 6A and 6B show top and side views of an optional oil-impregnated nylon bearing that may be inserted between shaft 30 and top plate 12 to further reduce rotational friction. FIGS. 7A and 7B show top and side views of the thin nylon thrust bearing 39 that carries the weight of the rotatable top plate 12.

Figure 8A:
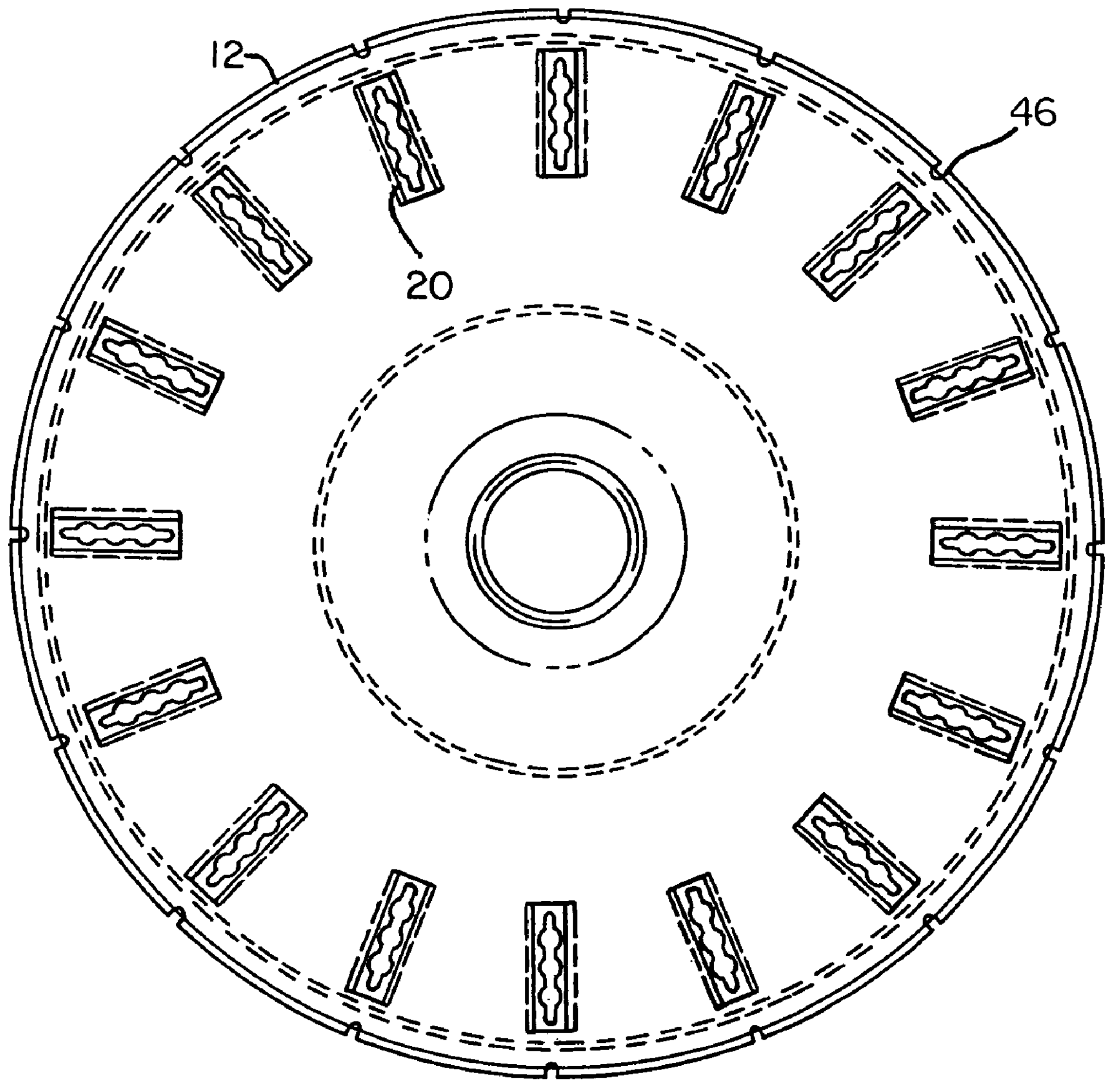
FIG. 8A shows a flush-mounted top plate of the securing device of FIG. 1, which is preferably comprised of aluminum.
Figure 8E:
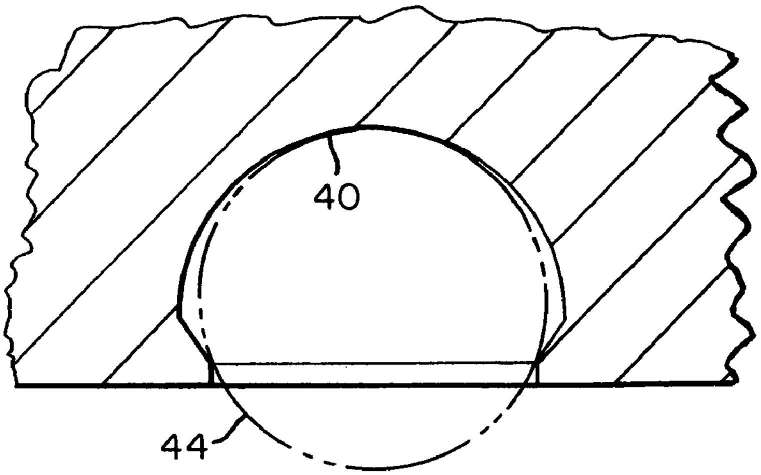
FIG. 8E shows a bearing raceway located in the bottom of the top plate shown in FIGS. 8C and 8D to support nylon ball bearings against the bottom plate.

FIGS. 8A, 8B, 8C, 8D, and 8E show further details of top plate 12. As shown, top plate 12 includes a series of radially disposed slots 20 (FIG. 8A) to which restraining straps or belts attach to fixedly hold in place transportable equipment and/or a handicapped person carried by such equipment. Top plate 12 also includes a series of ball bearing races 40, 42 circumferentially located around the plate (FIGS. 8B, 8C, and 8D). These races preferably carry nylon ball bearings 44 (FIG. 8E) that operatively bear against the bottom plate 10.

Figure 9A:
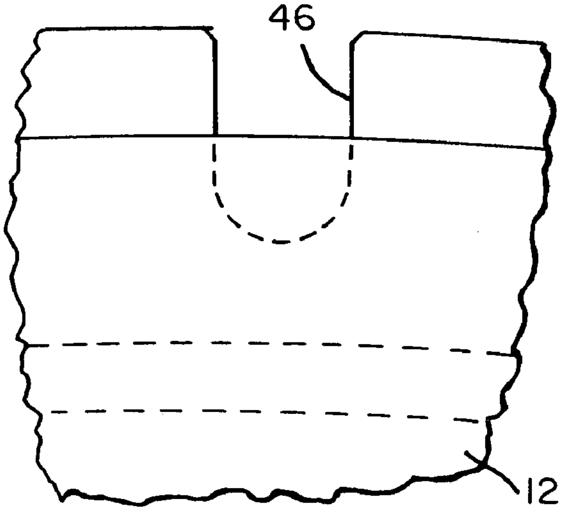
FIGS. 9A and 9B show top and side views of a slot in the top plate for receiving a sliding pin operative to restrain relative rotational movement between the top plate and the base plate of the securing device.
Figure 9B:
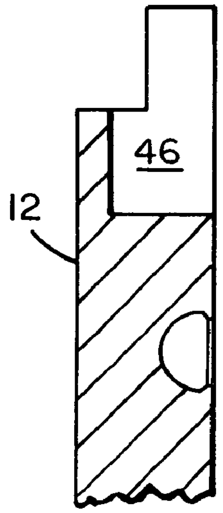

FIGS. 9A and 9B show top and side views of slots 46 located at the peripheral edges of top plate 12 (FIG. 8A).

These slots receive locking pins protruding from the base plate 10 to lock the top plate 12 at a fixed rotational position relative to the base plate 10.

Figure 10A:
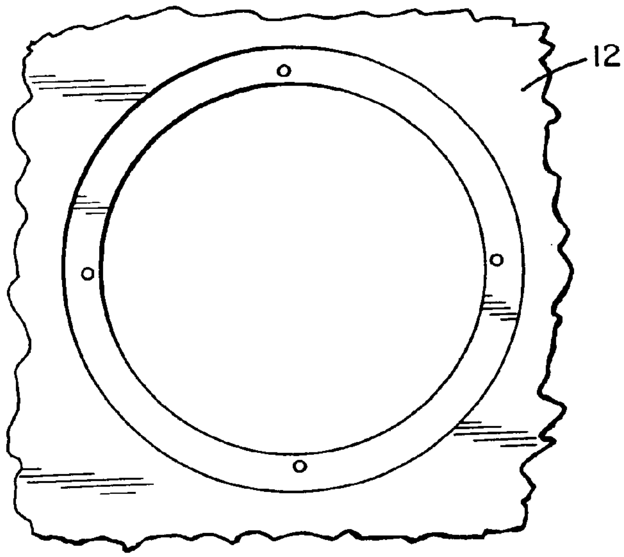
FIGS. 10A and 10B show top and side elevational views of an aluminum plate of the securing device.
Figure 10B:
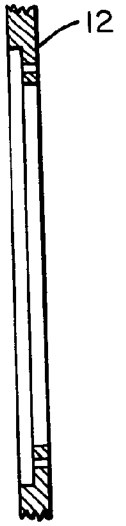
Figure 11A:
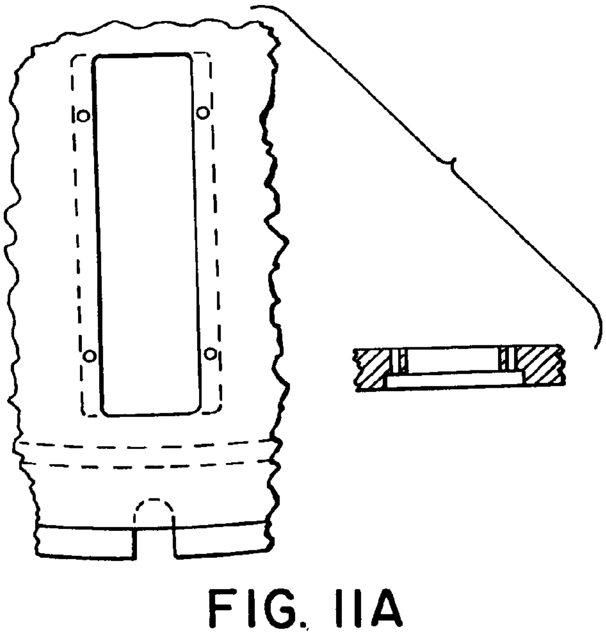
FIGS. 11A and 11B show belt insert assemblies of the top plate used to secure belts that fixedly support a wheelchair, scooter, or other transportable equipment.
Figure 11B:
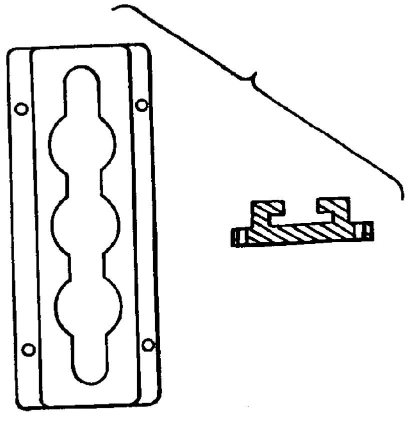

FIGS. 10A and 10B show a recess in the inner portion of the top plate 12 to receive retaining plate 32 (FIG. 4A). The material may comprise aluminum and the overall thickness may be in the range of one-half inch. FIGS. 11A and 11B show further details of the slots or belt inserts 20 disposed in or upon the top plate 12 to receive and attach restraining straps or belts.

Figure 12A:
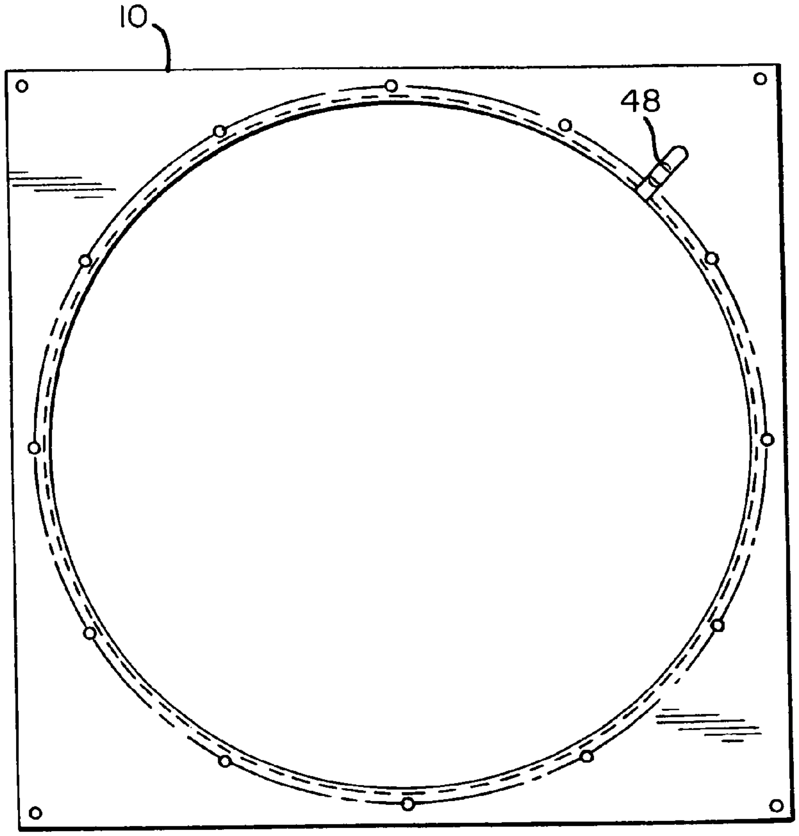
FIGS. 12A and 12B show a retaining ring mounted on a base plate to hold the top plate relative to the base plate of the securing device.
Figure 12B:
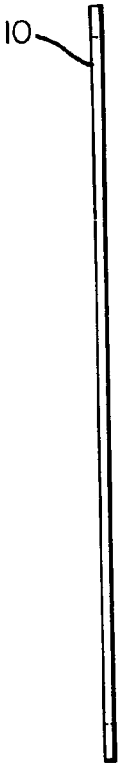

FIGS. 12A and 12B show a base plate 10, which includes locking pin assembly 48. One or multiple locking pin assemblies may be included in the base plate 10 or the retaining ring.

Figure 13A:
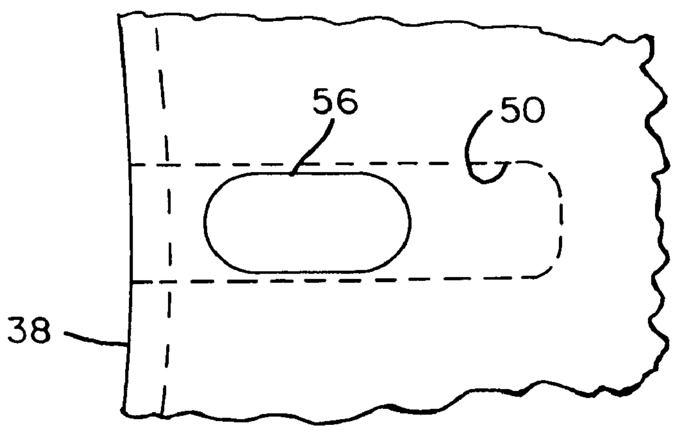
FIGS. 13A, 13B, and 13C show a locking mechanism of the retaining ring of FIGS. 12A and 12B to hold the top plate in a fixed angular alignment relative to the base plate, when engaged.
Figure 13C:
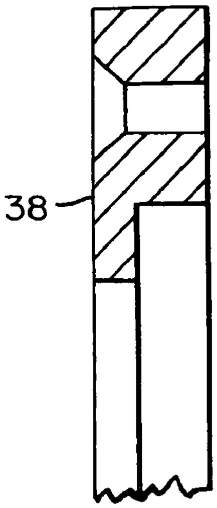
Figure 13B:
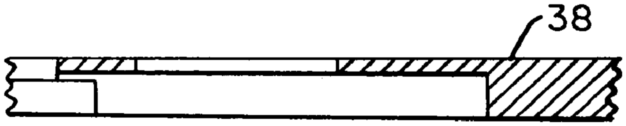

FIGS. 13A, 13B, and 13C show top, front, and side views of a locking mechanism of the retaining ring 38.

Figure 14A:
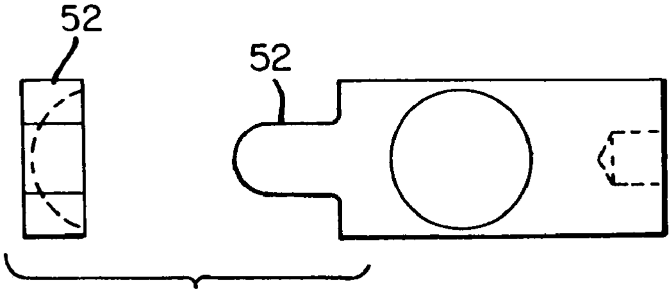
FIGS. 14A, 14B, and 14C show a spring-load locking pin assembly that is preferably disposed in the retaining ring to lock the rotational position of the top plate relative to the base plate.
Figure 14C:
Figure 14B:
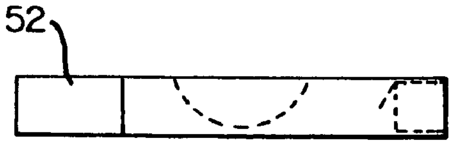

FIGS. 14A, 14B, and 14C show a spring-biased locking pin assembly that may be incorporated into the retaining ring 38 or the base plate 10. The illustrated assembly includes pin 52 that slideably moves within the slot 50 of retaining ring 38 (FIG. 13A) under force of spring 54 also disposed within the slot 50.

Figure 15A:
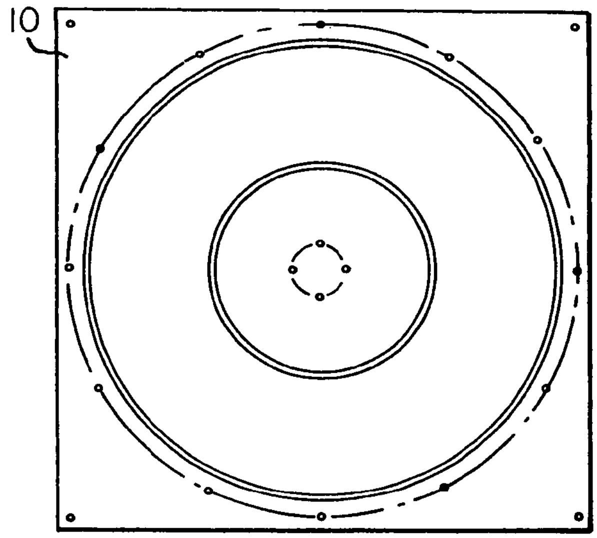
FIGS. 15A and 15B show a preferred base plate to rotationally support the top plate of the securing device.
Figure 15B:
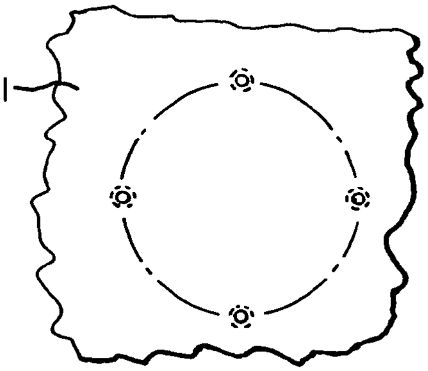

FIGS. 15A and 15B show a construction of a bottom plate 10 that may be secured to the floor 11 of a motor vehicle, such as a bus, train, air or other vehicle.

Figure 16A:
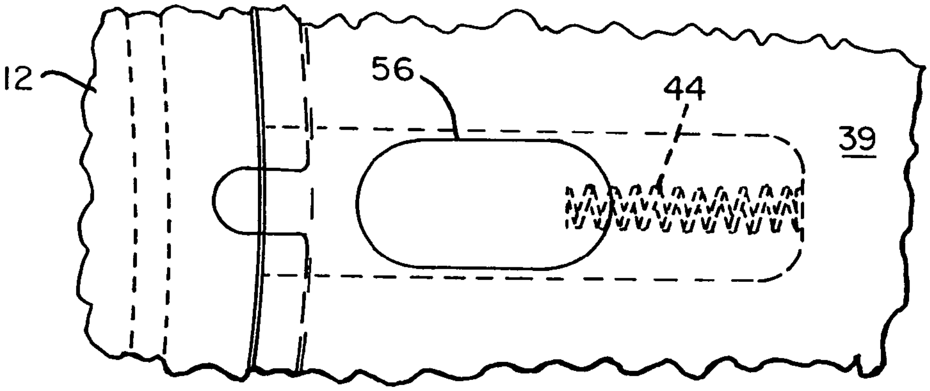
FIGS. 16A and 16B show a spring-loaded locking pin assembly that locks the top plate relative to the base plate.
Figure 16B:
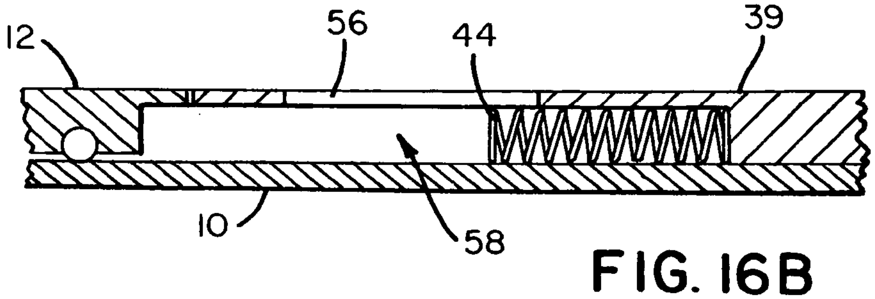

FIGS. 16A and 16B show top and side views of a spring-loaded slide lock when the bottom plate 10, top plate 12, and retaining ring 39 lie in assembled relation. As shown, an opening 56 in the retaining ring 38 enables physical access to the pin 52 (FIG. 14A) that lies in cavity 58 between the retaining ring 38 and base plate 10. The spring-loaded locking/ratcheting mechanism at least partially secures the rotational position of the top plate relative to the base plate. Advantageously, this assists ingress/egress movements of handicapped persons relative to the platform, e.g., the platform may be swiveled to an egress position before removing restraining straps in order to position the wheelchair or scooter in the desired direction.

Preferably, the securing device is flush-mounted with a floor although it need not be as such—depending on the desired application.

In view of the above teaching, other embodiments may be envisioned by those skilled in the art without departing from the spirit of the invention.

We claim:

1. A vehicle-mounted wheelchair swivel device to secure a handicapped person and a wheelchair or scooter, said device comprising:

a base plate mountable in or on a floor of a vehicle, a top plate rotationally mounted relative to a base plate and including a series of seat belt receptacles to receive straps that secure the wheelchair or scooter, a low-profile shaft that axially supports the top plate for rotational movement relative to the base plate, said shaft having a diameter relative to the diameter of a rotating periphery of the top plate so as to constrain radial movement of the top plate against lateral forces produced during vehicle transport, a set of ball bearings between the top plate and the base plate circumferentially disposed around a rotational axis of the top plate, and a retaining cap that secures the top plate relative to the base plate.

2. The device of claim 1, wherein said diameter of said low-profile shaft is a diameter of at least 10% of the diameter of the rotating periphery of the top plate.

3. The device of claim 2, further including a locking/ratcheting mechanism to secure rotational position of the top plate at discrete positions relative to the base plate.

4. The device of claim 3, wherein said locking/ratcheting mechanism comprises a spring-loaded plunger fixedly positioned relative to the base plate and operable to at least partially engage one of a series of detents in a peripheral edge associated with the top plate whereby to fixedly position the top plate at discrete rotational positions.

5. The device of claim 4, further comprising a flat circular thrust bearing between the top plate and the base plate to reduce friction between the top plate and the base plate when axial compressive forces are exerted upon the top plate.

6. The device of claim 5, wherein the top plate and the base plate substantially comprise aluminum.

7. The device of claim 6, wherein the ball bearings comprise nylon ball bearings.

8. The device of claim 7, further comprising an oil-impregnated nylon radial bearing between the shaft and the top plate.

9. A vehicle-mounted swivel device to restrain a handicapped person and a wheelchair or scooter in a motor vehicle, said device comprising:

a base plate mountable relative to a floor of a vehicle, a top plate rotationally mounted relative to the base plate and including a series of seat belt receptacles to receive straps that secure the wheelchair or scooter, a low-profile shaft that axially supports the top plate for rotational movement relative to the base plate, said shaft having a diameter of at least 10% a diameter of a rotating periphery of the top plate so as to constrain radial movement of the top plate against lateral forces produced during vehicle transport, a set of nylon ball bearings between the top plate and the base plate circumferentially disposed around a rotational axis of the top plate, a retaining cap that secures the top plate relative to the base plate, and a locking/ratcheting mechanism to at least partially secure rotational position of the top plate at discrete rotational positions relative to the base plate.

10. The device of claim 9, where said locking mechanism/ratcheting comprising a spring-loaded plunger fixedly positioned relative to the base plate and operable to at least partially engage one of a series of detents in a peripheral edge associated with the top plate whereby to fixedly position the top plate at said discrete rotational positions.

* * * * *